US012502087B2

(12) United States Patent
Sola i Caros et al.

(10) Patent No.: US 12,502,087 B2
(45) Date of Patent: Dec. 23, 2025

(54) METHOD FOR MONITORING BLOOD PRESSURE OF A USER USING A CUFFLESS MONITORING DEVICE

(71) Applicant: AKTIIA SA, Neuchâtel (CH)

(72) Inventors: Josep Maria Sola i Caros, Corcelles (CH); Elisa Olivero, Giez (CH); Olivier Grossenbacher, Neuchâtel (CH); Bastien De Marco, Lausanne (CH); Natalija Ignjatovic, Belgrade (RS); Blagoje Ignjatovic, Belgrade (RS); Matthieu Favre-Bulle, Les Ponts-de-Martel (CH); Sibylle Fallet, Corcelles-près-Concise (CH); Anna Vybornova, Geneva (CH)

(73) Assignee: AKTIA SA, Neuchâtel (CH)

(*) Notice: Subject to any disclaimer, the term of this patent is extended or adjusted under 35 U.S.C. 154(b) by 375 days.

(21) Appl. No.: 17/925,258

(22) PCT Filed: May 15, 2020

(86) PCT No.: PCT/IB2020/054636
§ 371 (c)(1),
(2) Date: Nov. 14, 2022

(87) PCT Pub. No.: WO2021/229276
PCT Pub. Date: Nov. 18, 2021

(65) Prior Publication Data
US 2023/0225624 A1     Jul. 20, 2023

(51) Int. Cl.
A61B 5/021     (2006.01)
A61B 5/00      (2006.01)
A61B 5/024     (2006.01)

(52) U.S. Cl.
CPC ........ *A61B 5/02108* (2013.01); *A61B 5/7221* (2013.01); *A61B 5/02427* (2013.01); *A61B 2560/0223* (2013.01); *A61B 2562/06* (2013.01)

(58) Field of Classification Search
CPC .............. A61B 5/02108; A61B 5/7221; A61B 5/02427; A61B 5/14551; A61B 5/02116; A61B 2560/0223; A61B 2562/06
See application file for complete search history.

(56) References Cited

U.S. PATENT DOCUMENTS

| 7,455,643 B1 | 11/2008 | Li et al. |
| 7,544,168 B2 | 6/2009 | Nitzan |

(Continued)

OTHER PUBLICATIONS

International Search Report and Written Opinion for PCT/IB2020/054636, dated Feb. 3, 2021, 9 pgs.

(Continued)

*Primary Examiner* — Peter Luong
(74) *Attorney, Agent, or Firm* — BLANK ROME LLP

(57) ABSTRACT

A method for monitoring blood pressure (BP) of a user using a cuffless monitoring system comprising a pulsatility waveform measuring device configured to measure a pulsatility waveform signal of the user, the method comprising an initialization routine (10) including performing an adequacy routine (20) for adjusting the measurement parameters of the pulsatility waveform measuring device (103); and performing a reliability test for determining a reliability of the measurement. The method provides incremental feedback of the adequacy of the acquired signals, the reliability of pulsatility waveforms, and the repeatability of the absolute BP values.

22 Claims, 7 Drawing Sheets

(56) References Cited

U.S. PATENT DOCUMENTS

| | | | |
|---|---|---|---|
| 2002/0137995 A1 | 9/2002 | Heckel | |
| 2010/0016734 A1* | 1/2010 | Sethi | A61B 5/02108 |
| | | | 600/485 |
| 2010/0079279 A1 | 4/2010 | Watson et al. | |
| 2017/0209053 A1* | 7/2017 | Pantelopoulos | A61B 5/7264 |
| 2017/0245767 A1* | 8/2017 | Ferber | A61B 5/7257 |
| 2017/0340209 A1* | 11/2017 | Klaassen | A61B 5/021 |
| 2018/0249915 A1* | 9/2018 | Qasem | A61B 5/02225 |
| 2019/0274553 A1 | 9/2019 | Peters et al. | |
| 2019/0274558 A1* | 9/2019 | Huijbregts | G01L 27/005 |
| 2019/0380580 A1* | 12/2019 | Kitagawa | A61B 5/0004 |
| 2019/0387986 A1 | 12/2019 | Kan et al. | |
| 2021/0000353 A1* | 1/2021 | Fujii | A61B 5/02125 |

OTHER PUBLICATIONS

B. Williams, et al., "2018 ESC/ESH Guidelines for the Management of Arterial Hypertension", European Heart Journal, vol. 39; 2018; pp. 3021-3104.

J. Solà, et al., "The Handbook of Cuffless Blood Pressure Monitoring", A Practical Guide for Clinicians, Researchers, and Engineers, Springer Nature Switzerland, https:/doi.org/10.1007/978-3-030-24701-0; 245 pgs, 2019.

* cited by examiner

METHOD FOR MONITORING BLOOD PRESSURE OF A USER USING A CUFFLESS MONITORING DEVICE

RELATED APPLICATION

This application is a national phase of PCT/IB2020/054636, filed on May 15, 2020. The contents of this application is hereby incorporated by reference in its entirety.

TECHNICAL DOMAIN

The present invention concerns a method for monitoring blood pressure (BP) of a user using a cuffless monitoring system.

BACKGROUND

Cuffless BP monitors determine BP avoiding the need to apply physical forces to the body. The main advantage of this approach is that by being "pressure-less" they allow more comfortable measurement experiences and are more prone to be implemented in ambulatory setups, by instance at home and during sleep. However, because the measured physical quantity is not BP (only a physiological quantity that relates to BP is read), these monitors typically requires a step of transforming the measured physical quantity towards a BP estimated value (in mmHg).

For a cuffless BP monitor one can differentiate between 1) the phase of initialization (or determination of the calibration parameters of a user that allow to transform the measured physical quantities towards BP estimated values), and 2) the phase of monitoring BP (or applying these calibration parameters to determine a BP reading). Note that for some devices and/or users the determination of the initialization parameters can be performed at the beginning and repeated after a given period of time.

Typically, cuffless BP monitors require a three-step procedure to determine a BP value (see Reference 1: Sola et al, "The Handbook of Cuffless Blood Pressure Monitoring", ISBN 978-3-030-24701-0).

First, the detection of a pulsatility waveform. Cuffless BP monitors rely on information related to arterial pulsatility, that is, the change of diameter of an artery or arterial bed occurring during a cardiac cycle. At a given body location, and for each cardiac cycle, the arrival of an arterial pressure wave generates a change in diameter of the arterial bed that induces a general displacement of the surrounding anatomical structures. The pulsatility energy can be captured from the skin surface by a variety of sensors. The common feature of these sensors is a generation of an electrical signal that encodes a pulsatility waveform whose contour describes the change of diameter of the underlying arterial bed.

Second, the generation of uncalibrated BP estimates. The pulsatility waveform is then analyzed to generate an uncalibrated BP value for systolic and diastolic. This step typically relies on a technique called Pulse Wave Analysis (PWA). PWA is the study of the morphology of the pulse pressure waveform. Because the pulsatility waveform is generated by the change in diameter of the arterial bed, and because the change in diameter is generated by the arrival of a pressure wave at the arterial bed, pulsatility signals are known to contain relevant information on the pressure waveform in time, amplitude, and frequency domains.

And third, the transformation of uncalibrated BP values into calibrated BP values. This final step of a cuffless BP monitor is intended to transform the uncalibrated BP values (expressed in arbitrary units) into systolic and diastolic BP values (expressed in mmHg units) that can be interpreted according to established clinical practices (see Reference 2: Williams et al, "2018 ESC/ESH Guidelines for the management of arterial hypertension: The Task Force for the management of arterial hypertension of the European Society of Cardiology (ESC) and the European Society of Hypertension (ESH)", https://doi.org/10.1093/eurheartj/ehy339). This calibration step utilizes as inputs the uncalibrated BP values, and a set of calibration parameters that characterize the transformation for a given subject. Examples of calibration parameters include a) population-wise parameters, and b) user-dependent parameters.

Population-wise calibration parameters characterize the transformation towards calibrated BP values by taking into consideration morphometric information (age, size, weight, gender, ethnicity, . . . ) of the user and applying a pre-calculated model of initialization (see Reference 1).

User-dependent calibration parameters characterize the transformation towards calibrated BP values by performing at least one measurement of absolute BP on the user by means of an external method or device.

A combined initialization process including population-wise and user-dependent calibration parameters is also possible. Other initialization processes are also possible based on evolutive learning on user data (see Reference 1). The phase of initialization can be implemented by performing at least a simultaneous reading of 1) a pulsatility waveform by means of a pulsatility waveform measuring device and 2) an absolute BP value of the user by means of an absolute BP measuring device.

U.S. Pat. No. 7,544,168B2 discloses simultaneously measuring the pulsatility waveform signals of a user by using a pulsatility waveform device, measuring an absolute BP value of a user using an absolute BP measuring device and further obtaining a calibration parameter of the user.

US 2019/0274553 A1 discloses a BP monitoring system that allows the simultaneous use of a pulsatility waveform measuring device and an absolute BP measuring device (all-in-one system), as well as non-simultaneous pulsatility waveform measuring device and an absolute BP measuring device (retro-fit system, allowing a manual calibration process where the user enters reference BP values into a user interface).

US 2019/0274553 A1 also discloses an initialization phase that detects if an incorrect position and/or change in position and/or too much movement is present during measurement, and further instructs the user to restart the measurement step via a user interface U.S. Pat. No. 7,455,643 B1, discloses methods to automatically decide when to perform an initialization step, and how and when to update the calibration parameters of a user.

US 2019/0274553 A1 discloses an initialization phase that instructs the user to start the initializing when predetermined conditions have been met. For example, after a predetermined time has elapsed or by monitoring other parameters such as the heart rate of the user.

However, known devices and methods do not provide good user experience of the entire initialization step. For example, a user should simultaneously measure pulsatility waveform signals and obtain reference cuff values having good quality. However, in real life, pulsatility waveform signals are not always adequate or reliable for processing (noisy signals, signals corrupted by motion, signals corrupted by ambient light interferences, device wrongly set on the user), and cuff-based measurements are not always reliable (because of bad placement of the cuff, or successive cuff measurements provide non-repeatable readings). Moreover, the user must wait until the full procedure is performed before obtaining a feedback whether the initialization was successful or not. This may result in a very poor user experience. This is particularly important for devices and methods to be used out of the clinical environment (for instance at home).

SUMMARY

In the present disclosure, a method for monitoring BP of a user using a cuffless monitoring system comprising a pulsatility waveform measuring device configured to measure a pulsatility waveform signal of the user, the method comprising: an initialization routine comprising providing an absolute BP measuring device configured to measure an absolute BP value of the user and measuring the absolute BP value, and using the measured absolute BP value to calculate a calibration parameter; and a monitoring routine comprising setting the pulsatility waveform measuring device on the user, measuring the pulsatility waveform signal, generating an uncalibrated blood pressure value from the measured pulsatility waveform, and calculating a calibrated blood pressure value from the uncalibrated blood pressure value and the calibration parameter. The initialization routine further comprises: generating guiding information instructing how to set the pulsatility waveform measuring device on the user; setting the pulsatility waveform measuring device on the user according to the first guiding information; performing an adequacy routine wherein said adequacy routine comprises the steps of, adjusting the measurement parameters of the pulsatility waveform measuring device, measuring a first segment of the pulsatility waveform signal for a first time period, determining an adequacy value of the measured first segment of pulsatility waveform by determining an amplitude of a baseline value or by determining an amplitude of pulsation of the first segment of the pulsatility waveform signal; if the adequacy value is smaller than an adequacy threshold value then repeating the adequacy routine; if the adequacy value is equal or greater than an adequacy threshold value then, performing a reliability test, wherein said reliability test comprises the steps of, measuring a second segment of the pulsatility waveform signal for a second time period, wherein the second time period occurs at a time which is after first time period, and determining a first reliability value of the measured second segment of pulsatility waveform from time or amplitude-related features of the second segment of pulsatility waveform; if the first reliability value is smaller than a reliability threshold value then repeating the initialization routine; if the first reliability value is equal to, or greater than, the reliability threshold value, then performing said steps of measuring the absolute BP value, and using the measured absolute BP value to calculate a calibration parameter.

The method disclosed herein provides "real-time" and incremental feedback of the adequacy of the acquired signals, the reliability of pulsatility waveforms, and the repeatability of the absolute BP values while the initialization is on-going in order to save user's time and useless efforts. The method allows to interactively correct any deviation.

The method disclosed herein can be used when the phase of initialization is performed by using an absolute BP measuring device in the form of an automated upper-arm or wrist cuff-based BP monitor reference device. The method can also be used by using a manual measurement performed by a skilled person.

SHORT DESCRIPTION OF THE DRAWINGS

Exemplar embodiments of the invention are disclosed in the description and illustrated by the drawings in which:

FIG. 1 refers to a method for monitoring BP of a user comprising an initialization routine, according to an embodiment;

FIG. 2 schematically shows a cuffless monitoring system, according to another embodiment;

EXAMPLES OF EMBODIMENTS

Figure 1:
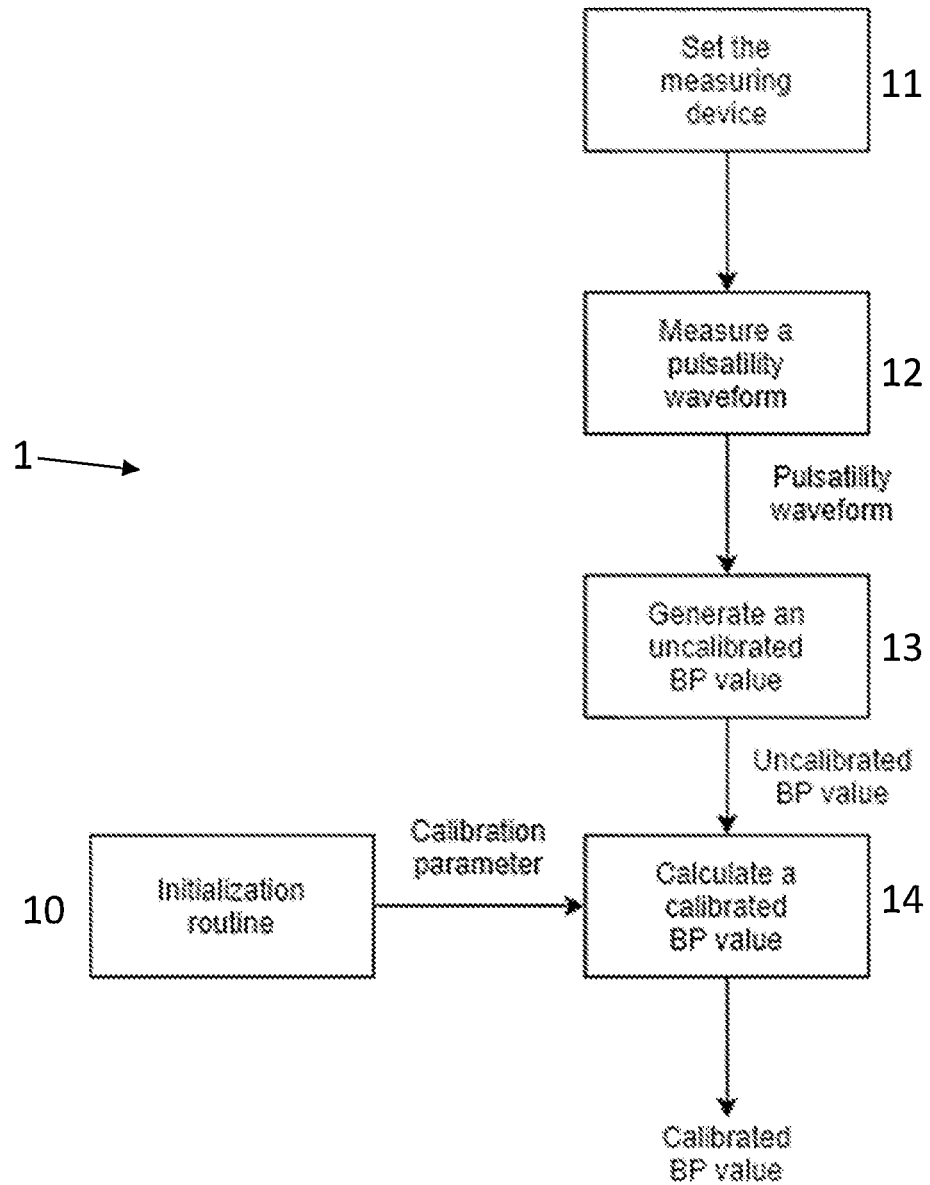

FIG. 1 refers to a method for monitoring blood pressure (BP) of a user using a cuffless monitoring system. The cuffless monitoring system, schematically shown in FIG. 2, comprises a pulsatility waveform measuring device 1 configured to measure a pulsatility waveform signal of the user, according to an embodiment. The method comprises an initialization routine 10 including the steps of providing an absolute BP measuring device 2 configured to measure an absolute BP value of the user and measuring the absolute BP value, and using the measured absolute BP value to calculate a calibration parameter.

The method comprises a monitoring routine that comprises the steps of setting the pulsatility waveform measuring device on the user 11, measuring the pulsatility waveform signal 12, generating an uncalibrated blood pressure value 13 from the measured pulsatility waveform, and calculating a calibrated blood pressure value 14 from the uncalibrated blood pressure value and the calibration parameter.

The initialization routine 10 can be initiated (triggered) 100 by the user or can be automatically triggered. In the latter case, the initialization routine 10 can be triggered at regular time interval, for instance every hour, once a week or once a month.

Figure 3:
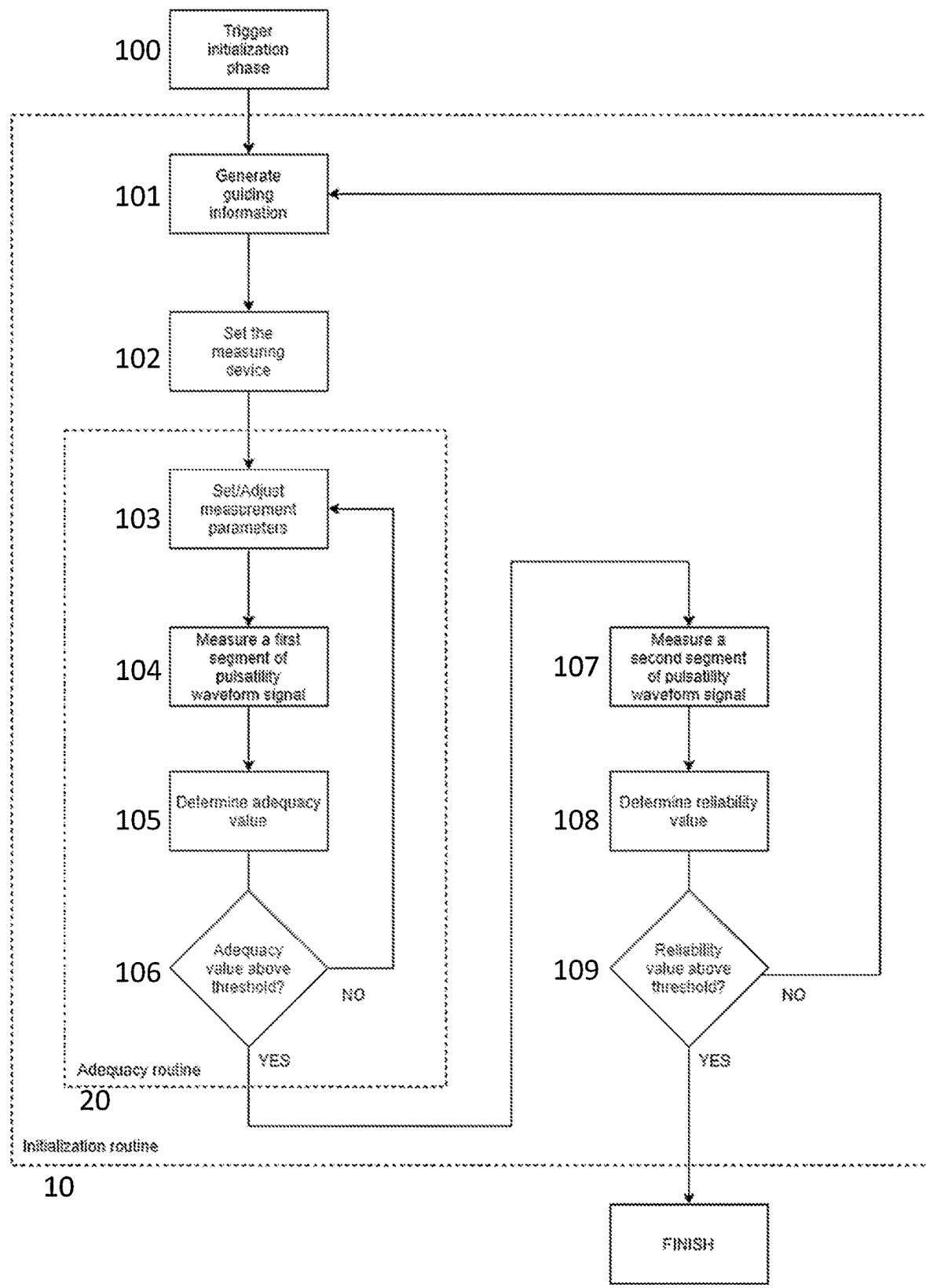
FIG. 3 shows the initialization routine, according to an embodiment.

In an embodiment show in FIG. 3, the initialization routine 10 comprises: generating guiding information 101 instructing how to set the pulsatility waveform measuring device on the user, and setting the pulsatility waveform measuring device 102 on the user.

The guiding information can further instruct how to connect the pulsatility waveform measuring device and/or the absolute BP measuring device, how to charge or switch on the devices, how to set the devices on the user, how to take an adequate body posture, how to position a limb, how to position the body part where the measuring devices are situated, how to relax before and/or during a measurement, how to perform a maneuver or exercise before and/or a measurement, how to breath before and/or during a measurement including an interactive guiding of the breathing pace and depth, a countdown from 5 to 1 sec before a new measurement of the measuring device will start, a countdown from 5 to 1 sec before a new measurement of the absolute BP device will start, the status and/or outcomes of any of the routines of the initialization phase, the number of performed iterations of the initialization routine, the number remaining measurements, and the reasons why the initialization routine is not successful, including but not only a low adequacy of the pulsatility waveform signal, a low reliability of the pulsatility waveform signal, or a low repeatability of the measured absolute BP value.

The initialization routine 10 further comprises performing an adequacy routine 20 including the steps of: adjusting the measurement parameters of the pulsatility waveform measuring device 103, measuring a first segment of the pulsatility waveform signal for a first time period 104, and determining an adequacy value of the measured first segment of pulsatility waveform 105. The adequacy routine is iterated 106 if the adequacy value is smaller than an adequacy threshold value.

The initialization routine 10 further comprises performing a reliability test comprising the steps of: measuring a second segment of the pulsatility waveform signal 107 for a second time period; and determining a first reliability value 108 of the measured second segment of pulsatility waveform; wherein the initialization routine is iterated 109 if the reliability value is smaller than a reliability threshold value.

The initialization routine is iterated 109 if the reliability value is smaller than a reliability threshold value. In other words, the steps 101 to 108 are repeated until the reliability value is equal or greater than the reliability threshold value. When the reliability value is equal or greater than the reliability threshold value, the initialization routine 10 is completed, and the monitoring routine can be started in an automated fashion.

In another aspect, the adequacy and reliability threshold values can comprise predefined value that has been determined in a training set of data.

In one aspect, the second reliability value can be varied at each iteration of the initialization routine 10.

In yet another aspect, the adequacy and reliability threshold values are adjustable in depending on the number of iterations of the initialization routine 10. The adequacy and reliability threshold values can decrease for increasing number of iterations of the initialization routine. An advantage of decreasing the reliability threshold values with increasing number of iterations allows for make the initialization routine iteration less selective that the subsequent initialization routines such that avoid a user to become blocked in the initialization procedure. For instance, during the first iteration of the initialization routine a selective reliability threshold value allows for insuring that the pulsatility waveform measuring device is properly worn before allowing the user to continue the routine. At later iterations, the initialization routine need not be reiterated for a small movement of the pulsatility waveform measuring device.

In yet another aspect, the duration of the second time period is adjustable in accordance with the user's heart rate, such that the second time period include at least three heart beats. Here, the duration of the second time period is shorter for a user having a fast heart rate.

In yet another aspect, the method can comprise a step of inputting subject-dependent information. The reliability threshold value can then be adjusted in accordance with the subject-dependent information. This step provides a reliability threshold value that is user dependent.

Referring to FIG. 3, the reliability test 107-109 can be performed once (only once), after performing an adequacy routine 20. The initialization routine 10 is repeated if the reliability value is smaller than the reliability threshold value.

Figure 4:
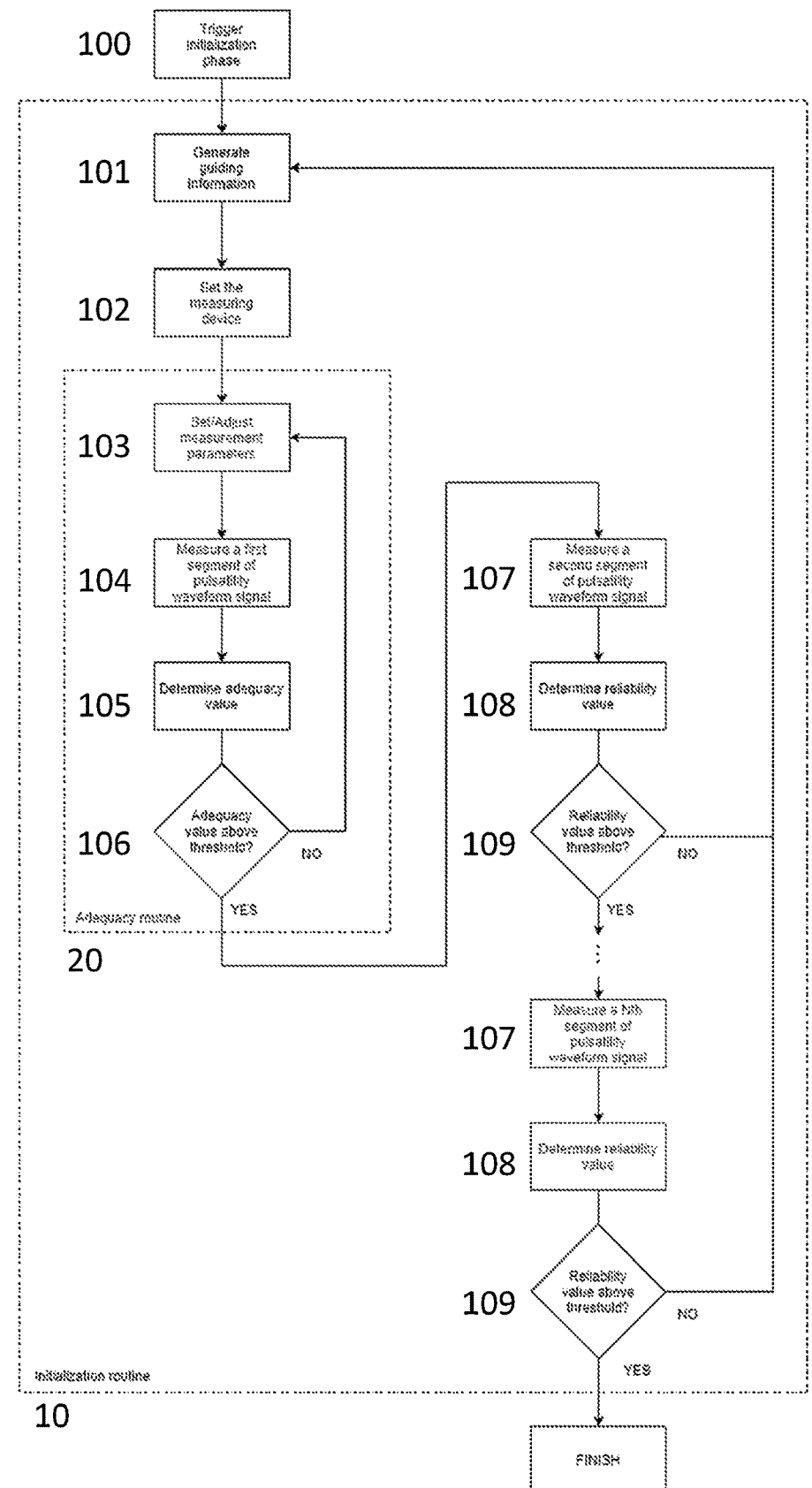
FIG. 4 shows the initialization routine, according to another embodiment.

FIG. 4 shows the method according to another embodiment wherein said performing a reliability test can be repeated once or a plurality of times. For example, once the reliability test 107-109 has been performed and the reliability value is equal or greater than the reliability threshold value, instead of starting the monitoring routine, another reliability test is performed. In other words, the reliability test 107-109 can be performed a plurality of times within a single iteration of the initialization routine 10. As a result, another second segment of the pulsatility waveform signal 107 is measured that can be added to the previously measured second segment of the pulsatility waveform signal 107, allowing for improved determination of the reliability value 108. The reliability threshold value used in this second reliability test can be varied when performing the supplemental reliability tests. For example, the second reliability threshold value can be increased between two subsequent reliability tests such as to increase the selectivity of the test at each supplemental reliability test. The second time period can be varied when performing the supplemental reliability tests. For example, the second time period can be increased between two subsequent reliability tests such as to increases the accuracy of the determined reliability value 108 at each supplemental reliability test. The second time period can be between 1 s to 30 s. For example, the second time period can have a duration of 2, 5, 8, 10, 15 or 30 seconds.

In the case the pulsatility waveform measuring device is destined to be in contact with the user, for example a photoplethysmographic (PPG) sensor destined to contact a tissue (such as skin) of the user, the reliability value of the measured second segment of pulsatility waveform can depend on the contact. The contact in turn can depend on the proper positioning and/or attachment of the pulsatility waveform measuring device on the user. For example, in the case of the pulsatility waveform measuring device comprising a PPG sensor arranged in a wrist band or chest band, the contact is affected by the tension in the band. In the case the pulsatility waveform measuring device is contactless, such as a camera-based sensor, the reliability value can depend on the focusing and/or direction of the radiating signal emitted by the contact-less sensor. The reliability value will further reflect whether the pulsatility waveform measuring device is properly worn by the user and/or attached to the suitable part of the user.

The reliability value can be determined by analyzing the measured second segment of pulsatility waveform. For instance, determining the reliability value can comprises an amplitude of the second segment of pulsatility waveform. The amplitude of the second segment of pulsatility waveform can correspond to the amount of optical radiation reaching the sensor after having penetrated the tissue (DC component) and to an indication of if the pulsatility waveform measuring device is worn or not worn. In particular, the reliability value can be indicative of a worn/not worn. The reliability value can correspond to the absence of measurement of the pulsatility waveform signal by the pulsatility waveform measuring device.

In an aspect, the reliability value can be determined from the morphology of the measured second segment of pulsatility waveform (shape or waveform). For instance, the reliability value can be determined from how the second segment of pulsatility waveform is representative of a cardiovascular signal (good quality signal).

In another aspect, the reliability value can be determined from time or amplitude-related features, for example obtained by a pulse-wave analysis of the second segment of pulsatility waveform. The features can be calculated in the time or the frequency domain, or any other transformed domain. Such features can include amplitude of the signal, repeatability of the signal, features representative of a cardiovascular signal. The features can be identified for each pulse of the measured pulsatility waveform signal or in an averaged pulse. Statistics on the repeatability across pulses of the measured pulsatility waveform signal can also be determined.

In yet another aspect, the reliability value can be determined by determining whether the measured pulsatility waveform signal contains detectable information on blood pressure. For example, the determination of the reliability value can comprise quantifying the presence and/or reliability of information comprised in the measured second segment of pulsatility waveform that is used for BP determination. For example, for arrival time methods, the determination of the reliability value can comprise determining the reliability of detection of the foot of the waveform. For pulse wave analysis methods, the determination of the reliability value can comprise whether the analysis can be successfully performed (for instance, whether relevant pulse wave analysis features can be detected).

In an embodiment, the pulsatility waveform measuring device can comprises a local processing module 3. In such configuration, the determination of reliability value can be performed in the local processing module 3. There is no need to transfer the measured second segment of the pulsatility waveform signal to a remote device. However, the calculation power and/or memory size of the local processing module 3 can be limited. The code and/or calculations performed in local processing module may also become available to third parties (by acquiring the wearable pulsatility waveform measuring device.

In another embodiment, the cuffless monitoring system comprises a remote processing module 4 remote from the pulsatility waveform measuring device. The remote processing module 4 can be used for performing the determination of reliability value. Here, the pulsatility waveform signal device can comprise a transfer module 5 configured to transfer the measured second segment of the pulsatility waveform signal to the remote processing module 4. The remote processing module can be a remote server or any other device with processing capabilities such a smartphone or a PC. The remote processing module allows for performing complex calculations and the risk of the code and/or calculations performed in the remote processing module becoming available to third parties is limited.

In yet another embodiment, the determination of the adequacy value is performed in the local processing module 3. In the case the reliability test 107-109 is performed a plurality of times within a single iteration of the initialization routine 10 (see FIG. 4), the determination of the reliability value can be performed in the local processing module 3 for at least the initial reliability test 107-109, the determination of the reliability value for the subsequent reliability tests 107-109 being done in the remote processing module 4. An advantage of this procedure is that the calculations performed in the local processing module can provide a fast feedback to the user and more complex and critical calculations can be performed on the remote processing module. The determination of the reliability value for the one or plurality of initial reliability tests 107-109 can use few data and thus require less calculation power. The determination of the reliability value for the subsequent reliability tests 107-109 use more data (longer measurement time period) and require more calculation power. The latter determinations are more accurate.

The adequacy and reliability threshold values can further be adjusted for the user. For example, the reliability threshold value can be adjusted depending on age, skin color, skin perfusion, fat quantity, and cardiovascular status of the user. The reliability threshold value can be further adjusted with the use of the cuffless monitoring system, for example, in time.

In an embodiment, the cuffless monitoring system comprises an additional measuring device configured to measure an additional signal. The method can further comprise a step of measuring the additional signal. The reliability value can then be determined by using the measured additional signal. The additional signal can comprise any one of: a motion signal, a signal representative of a pressure between the pulsatility waveform measuring device and a tissue of the user, a bioimpedance or biopotential signal, an optical signal characterizing the interface between the pulsatility waveform measuring device and a tissue of the user. The additional signal can further comprise a tension signal, for example for measuring a tension of the band when the waveform measuring device comprises an optical sensor in a wrist or chest band. The additional signal can further comprise an optical signal, for example for characterizing the interface between the sensor and a tissue (skin).

In an embodiment, the pulsatility waveform measuring device comprises a PPG device comprising at least a light source and a light detector and an analog-to-digital converter (ADC). Said adjusting the measurement parameters comprises adjusting the emission power of the light source and/or the sensitivity of the light detector and/or ambient light suppression characteristics and/or the gain and bandwidth of the ADC. The measurement parameters can further be adjusted by adjusting analog filtering and/or the ambient light suppression characteristics.

The pulsatility waveform measuring device can comprise a plurality of light source channels and the measurement parameters can be adjusted by selecting a light source channel. Similarly, the pulsatility waveform measuring device can comprise a plurality of light detectors and the measurement parameters can be adjusted by selecting a light detector channel.

The first segment of pulsatility waveform sign can be measured for a first time period of 10 ms, 100 ms, or 1000 ms.

In one aspect, the adequacy value of the measured first segment can be determined by determining the amplitude of the baseline value of the signal (DC value) and/or by determining the amplitude of the pulsation of the signal (AC value).

In one aspect, the adequacy threshold value can be a predefined value that has been determined in a training set of data. The adequacy threshold value can be adjusted during the initialization process.

In an embodiment, the adequacy value can be determined by determining an amplitude of a baseline value or determining an amplitude of pulsation of the first segment of the pulsatility waveform signal.

The adequacy threshold value can be a predefined value that has been determined in a training set of data. The adequacy threshold value can be adjustable as a function of the number repetition of the adequacy routine, i.e., the steps of adjusting the measurement parameters 103, measuring a first segment 104 and determining an adequacy value 105. In one aspect, the adequacy threshold value decreases with the number repetition of the steps 103, 104 105.

Figure 5:
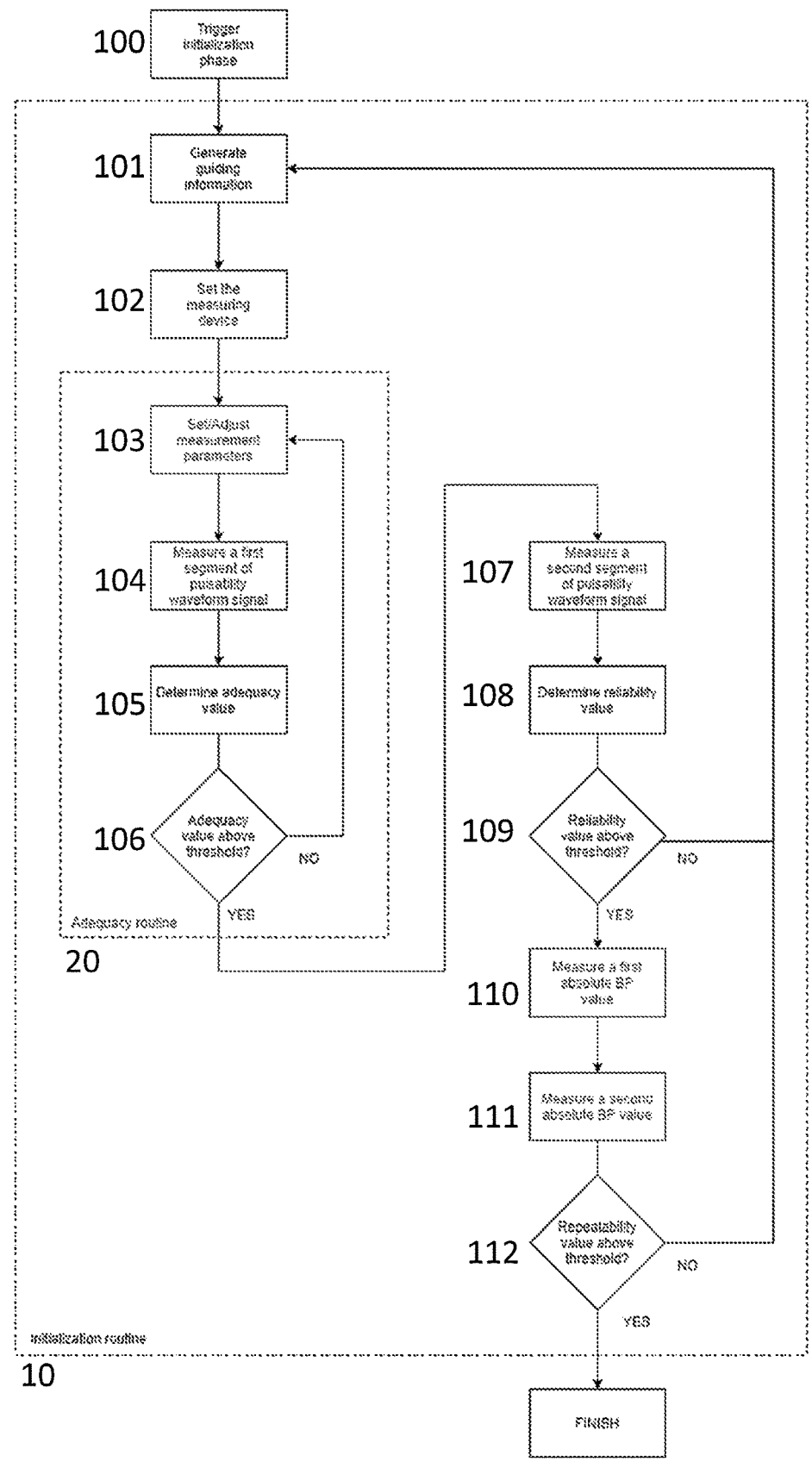
FIG. 5 illustrates a schematic representation of the method, according to yet another embodiment.

FIG. 5 shows a schematic representation of the initialization routine 10, according to yet another embodiment. Here, the initialization routine 10 further comprises an absolute BP routine including performing a plurality of absolute BP measurements 110 such as to obtain a plurality of measured absolute BP values, and determining a repeatability of the measured absolute BP values 112. In FIG. 5 a first and second measurement of an absolute BP value are shown. The initialization routine can be iterated if the repeatability is smaller than a repeatability threshold value 112.

Figure 6:
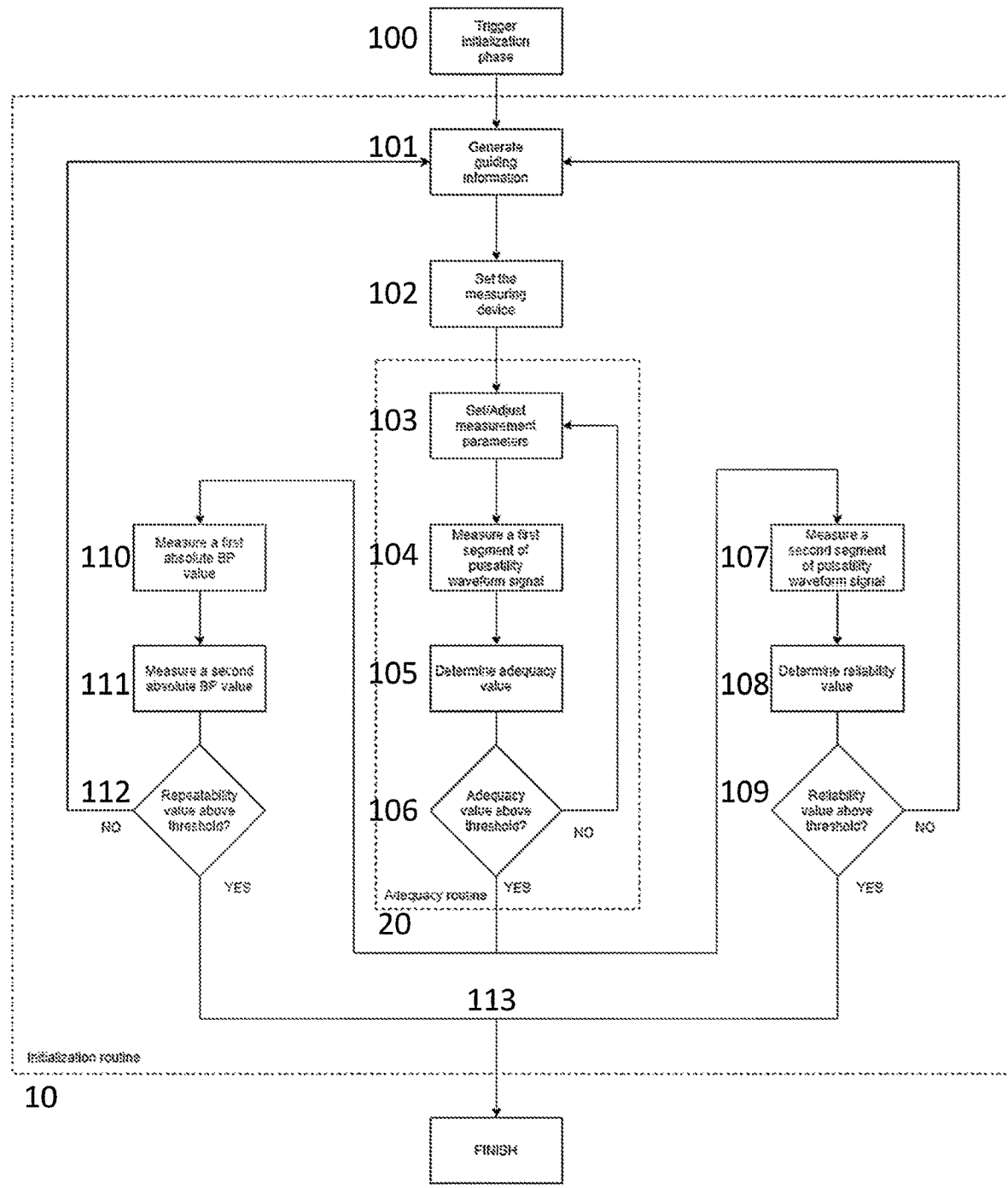
FIG. 6 shows the initialization routine, according to yet another embodiment.

In the example of FIG. 5, the absolute BP routine 110-112 can be performed after performing the reliability test 107-109. In another embodiment shown in FIG. 6, the absolute BP routine 110-112 can be performed in parallel with the reliability test 107-109.

Figure 7:
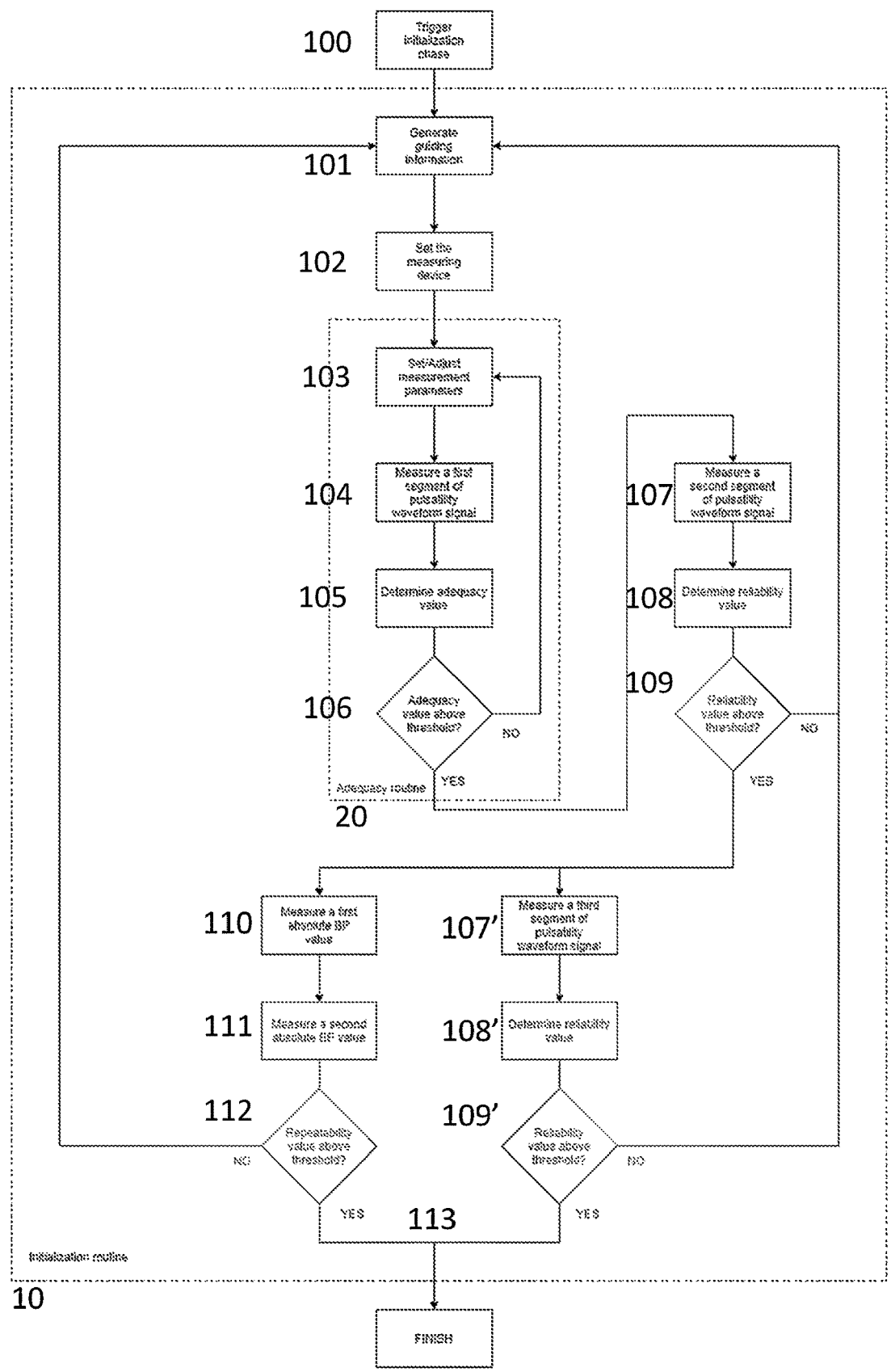
FIG. 7 shows the initialization routine, according to yet another embodiment.

In yet another embodiment shown in FIG. 7, the absolute BP routine 110-112 can be performed in parallel with performing the reliability test 107-109 only after the reliability test has been performed at least once. As shown in the example of FIG. 7, a first the reliability test 107-109 is performed after performing the adequacy routine 20. When the reliability value is equal or larger than the reliability threshold value, at least an additional reliability test 107-109 is performed in parallel with the absolute BP routine 110-112.

The repeatability of the measure absolute BP values can be determined by any of, or a combination of: calculating the difference between the measured absolute BP values, by calculating the spread across the measured BP values, or by calculating the difference between the measured absolute BP values and previously measured BP values on the same user. Typically, the repeatability value is calculated as the inverse of the exemplified calculations, so that very different absolute BP values will generate a very low repeatability value.

The initialization routine 10 is completed, and the monitoring routine can be started, when reliability value is equal or greater than the reliability threshold value and when the repeatability of the measure absolute BP values equal or greater than the repeatability threshold value 112.

Alternatively, completing the initialization routine 10 can be decided upon a combination 113 (see FIGS. 5 and 6) of the repeatability of the measure absolute BP values with the reliability value. Example of such combinations can include: determine whether two calculated reliability values remain stable during two measurements of absolute BP values, determine whether uncalibrated blood pressure values stay stable during two measurements of absolute BP values, determine whether two obtained calibration parameters stay stable during two measurements of absolute BP values, determine whether calibration parameters and absolute BP values vary on the same or on different directions, determine whether the obtained calibration parameters are comparable to calibration parameters previously obtained on the same user.

The repeatability threshold value can be between 4 and 10 mmHg or 8 and 10 mmHg or 8 mmHg.

In one aspect, calculating a calibration parameter can comprise: measuring the pulsatility waveform signal, generating an uncalibrated blood pressure value from the measured pulsatility waveform, calculating a function that transforms the uncalibrated blood pressure value into the measured absolute BP, and defining the calibration parameter as the characterization of the calculated function.

On other aspects, the pulsatility waveform measuring device can comprise an optical sensor destined to be worn on the wrist, upper arm, ear lobe, inside ear canal, chest, at the forehead, under the skin, fingertip, finger phalanx, inside the body, e.g. in a natural orifice or implanted (for instance, under the skin).

The pulsatility waveform measuring device can comprise an optical sensor, distance sensor, RF sensor, acoustic sensor, temperature sensor, pressure sensor, ultrasound sensor, bio-impedance sensor, electric sensor, tonometer sensor, cuff-based sensor, strain sensor.

The absolute BP measuring device can comprise an upper arm cuff, a wrist cuff, a finger cuff, or any other automated cuff.

The absolute BP measuring device can be any of a manual measurement performed by a skilled person via the so-called auscultation method, an automated measurement performed by an upper-arm or a wrist cuff via the so-called oscillometric method, an automated measurement performed by a finger cuff via the so-called volume-clamp method, an automated measurement performed by an invasive arterial line catheter, or any other means to obtain an absolute reading of the BP of a user. The absolute BP measurements can be used to calculate a user-dependent model of calibration that will be stored in a database, and further used every time that the method for monitoring BP is used to obtain a calibrated BP reading for that particular user. Examples of user-dependent model of calibration are given in Reference 1.

Performing a plurality of absolute BP measurements 110 can include limiting the maximum amount of allowable inflations of a cuff. This is important for security and comfort reasons. For instance, during the initialization routine, a maximum of 3, 4, or 5 uses of the absolute BP measuring device can be allowed.

A minimum allowed time between two consecutive iteration of the initialization routine can be also introduced. For instance, the time elapsed between two initialization iterations can be longer than 10 min, 30 min or 60 min.

Figure 2:
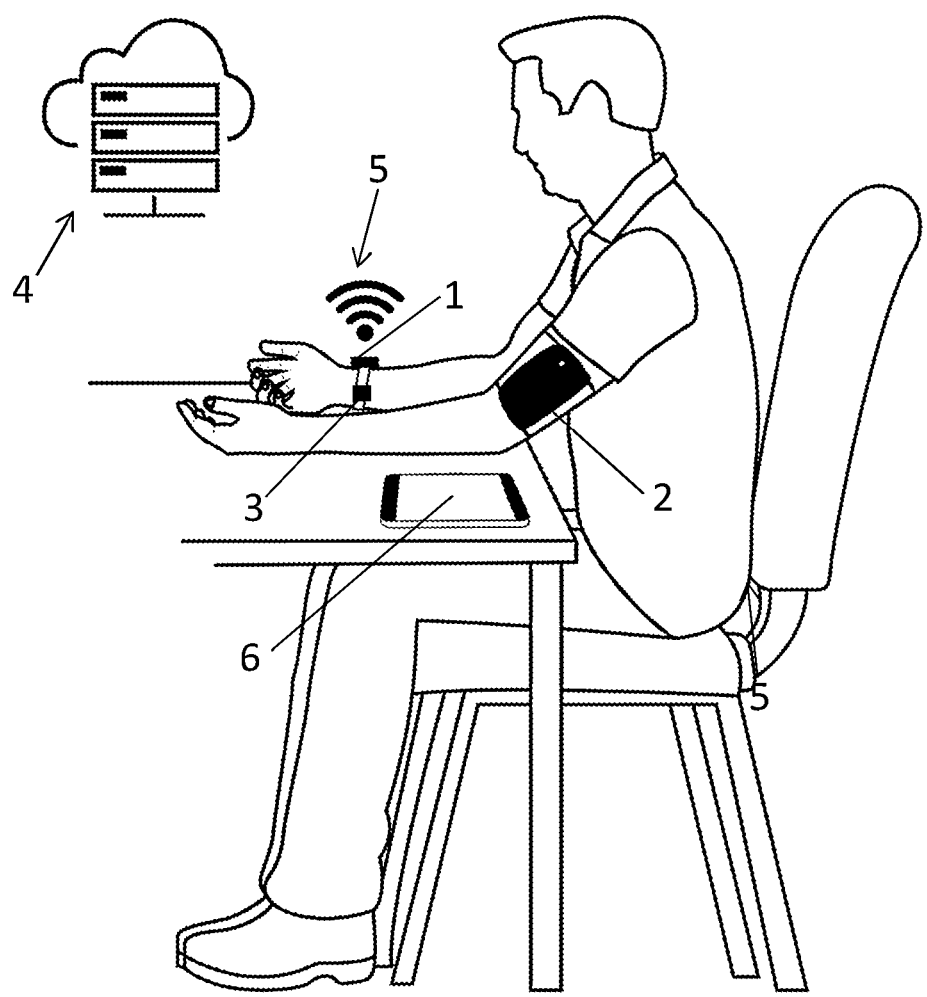

The cuffless monitoring system can comprise a user interface (see FIG. 2). The user interface can comprise a smartphone (smartphone application), a computer program, a website, etc.

The user interface can be used to manually or automatically input the measured absolute BP values. The measured absolute BP values can be automatically input by establishing a connection (wireless such as Bluetooth or WiFi, or wired via a serial or a parallel communication bus) between the absolute BP measuring device and the local processing module. The measured absolute BP values can be manually input from an external measuring device or by a skilled operator.

The user interface can be used to display (possibly visually and/or audibly) the guiding information 101, for example by means of a video, images, interactive learning, a user manual, a phone call, or a video conference.

The user interface can further be used to remind the user to restart (trigger) the initialization routine 10 after a certain time period and/or when changes in signal quality or other information is detected, for instance, if changes in the pulsatility waveforms are detected, or changes any cardiovascular parameter is detected (heart rate). A new initialization routine 10 may be performed for the reasons above.

The cuffless monitoring system can be configured to start the monitoring routine when the initialization routine 10 is completed.

The invention claimed is:

1. A method for monitoring blood pressure (BP) of a user using a cuffless monitoring system comprising a pulsatility waveform measuring device configured to contact a tissue of the user or to be contactless and to measure a pulsatility waveform signal to a body location of the user and a processing module, the method comprising:
   an initialization routine comprising providing an absolute BP measuring device configured to measure an absolute BP value of the user and measuring the absolute BP value, and using the measured absolute BP value to calculate a calibration parameter; and a monitoring routine comprising setting the pulsatility waveform measuring device on the user, measuring the pulsatility waveform signal, generating an uncalibrated blood pressure value from the measured pulsatility waveform, and calculating a calibrated blood pressure value from the uncalibrated blood pressure value and the calibration parameter;

wherein the initialization routine further comprises:

generating guiding information instructing how to set the pulsatility waveform measuring device on the user;

setting the pulsatility waveform measuring device on the user according to the first guiding information;

performing an adequacy routine wherein said adequacy routine comprises the steps of, adjusting the measurement parameters of the pulsatility waveform measuring device, measuring a first segment of the pulsatility waveform signal for a first time period, determining an adequacy value of the measured first segment of pulsatility waveform by determining an amplitude of a baseline value or by determining an amplitude of pulsation of the first segment of the pulsatility waveform signal; if the adequacy value is smaller than an adequacy threshold value then repeating the adequacy routine;

if the adequacy value is equal or greater than an adequacy threshold value then, performing a reliability test, wherein said reliability test comprises the steps of, measuring a second segment of the pulsatility waveform signal for a second time period, wherein the second time period occurs at a time which is after first time period, and determining a first reliability value of the measured second segment of pulsatility waveform from time or amplitude-related features of the second segment of pulsatility waveform;

wherein the adequacy routine and the reliability test are performed in a processing module comprised in the cuffless monitoring system;

if the first reliability value is smaller than a reliability threshold value then repeating the initialization routine;

if the first reliability value is equal to, or greater than, the reliability threshold value, then performing said steps of measuring the absolute BP value, and using the measured absolute BP value to calculate a calibration parameter, wherein the adequacy routine and the reliability test are performed before said calculating a calibration parameter and said calculating a calibrated blood pressure value from the uncalibrated blood pressure value and the calibration parameter.

2. Method according to claim 1,
wherein the pulsatility waveform measuring device comprises a local processing module; and
wherein the method further comprises performing said determination of reliability value in the local processing module.

3. Method according to claim 2,
further comprising said determination of the adequacy value in the local processing module.

4. Method according to claim 2,
wherein the adequacy and reliability threshold values are adjustable; and
wherein the method further comprises adjusting the adequacy and reliability threshold values as a function of the number of iterations of the initialization routine.

5. Method according to claim 1,
wherein the cuffless monitoring system comprises a remote processing module remote from the pulsatility waveform measuring device; and
wherein the method further comprises performing said determination of reliability value and/or of the adequacy value in the remote processing module.

6. Method according to claim 5,
further comprising decreasing the adequacy and reliability threshold values for increasing number of iterations of the initialization routine.

7. Method according to claim 6,
wherein the pulsatility waveform measuring device comprises a plurality of light source channels; and
wherein said adjusting the measurement parameters comprises selecting a light source channel.

8. Method according to claim 6,
wherein the pulsatility waveform measuring device comprises a plurality of light detectors; and
wherein said adjusting the measurement parameters comprises selecting a light detector channel.

9. Method according to claim 1,
wherein the pulsatility waveform measuring device comprises a local processing module and the cuffless monitoring system comprises a remote processing module remote from the pulsatility waveform measuring device;
wherein the method further comprises performing said determination of the reliability value in the local processing module for at least a first of the reliability tests and in the remote processing module for subsequent reliability tests.

10. Method according to claim 1,
wherein the predefined duration of the second time period is adjustable in accordance with the user's heart rate; and
wherein the method further comprise adjusting the predefined duration of the second time period such that the second time period include at least three heart beats.

11. Method according to claim 1,
wherein each of the adequacy and reliability threshold values comprise a predefined value; and
wherein the method further comprises determining said predefined value of the adequacy and reliability threshold values in a training set of data.

12. Method according to claim 1,
comprising a step of inputting subject-dependent information; and
adjusting the adequacy and reliability threshold values in accordance with the subject-dependent information.

13. Method according to claim 1,
wherein the cuffless monitoring system comprises an additional measuring device configured to measure an additional signal; and
wherein the method further comprises a step of measuring the additional signal using the additional measuring device.

14. Method according to claim 13,
further comprising determining the reliability value by using the measured additional signal.

15. Method according to claim 13,
wherein the additional signal comprises any one of: a motion signal, a signal representative of a pressure between the pulsatility waveform measuring device and a tissue of the user, a bioimpedance or biopotential signal, a tension signal, an optical signal characterizing the interface between the pulsatility waveform measuring device and a tissue of the user.

16. Method according to claim 1,
wherein the pulsatility waveform measuring device comprises a PPG device comprising at least a light source channel, a light detector and an analog-to-digital converter (ADC); and
wherein said adjusting the measurement parameters comprises adjusting the emission power of the light source and/or the sensitivity of the light detector and/or ambient light suppression characteristics and/or the gain and bandwidth of the ADC.

17. Method according to claim 1,
wherein the initialization routine further comprises a BP routine including performing a plurality of absolute BP measurements such as to obtain a plurality of measured absolute BP values, and determining a repeatability of the measured absolute BP values;
wherein the initialization routine is iterated if the repeatability value is smaller than a than a repeatability threshold value.

18. Method according to claim 17,
comprising performing the BP routine after said performing a repeatability test.

19. Method according to claim 17,
comprising determining a repeatability of the measured absolute BP values by any of, or a combination of: calculating the difference between the measured absolute BP values, by calculating the spread across the measured BP values, or by calculating the difference between the measured absolute BP values and previously measured BP values on the same user.

20. Method according to claim 17,
wherein the repeatability threshold value is between 4 and 10 mmHg or 8 and 10 mmHg or 8 mmHg.

21. Method according to claim 1,
wherein calculating a calibration parameter comprises: measuring the pulsatility waveform signal, generating an uncalibrated blood pressure value from the measured pulsatility waveform, calculating a function that transforms the uncalibrated blood pressure value into the measured absolute BP, and defining the calibration parameter as the characterization of the calculated function.

22. A method for monitoring blood pressure (BP) of a user using a cuffless monitoring system comprising a pulsatility waveform measuring device configured to measure a pulsatility waveform signal of the user, the method comprising:
an initialization routine comprising providing an absolute BP measuring device configured to measure an absolute BP value of the user and measuring the absolute BP value, and using the measured absolute BP value to calculate a calibration parameter; and
a monitoring routine comprising setting the pulsatility waveform measuring device on the user, measuring the pulsatility waveform signal, generating an uncalibrated blood pressure value from the measured pulsatility waveform, and calculating a calibrated blood pressure value from the uncalibrated blood pressure value and the calibration parameter;
wherein the initialization routine further comprises:
generating guiding information instructing how to set the pulsatility waveform measuring device on the user;
setting the pulsatility waveform measuring device on the user according to the first guiding information;
performing an adequacy routine wherein said adequacy routine comprises the steps of, adjusting the measurement parameters of the pulsatility waveform measuring device, measuring a first segment of the pulsatility waveform signal for a first time period, determining an adequacy value of the measured first segment of pulsatility waveform by determining an amplitude of a baseline value or by determining an amplitude of pulsation of the first segment of the pulsatility waveform signal; if the adequacy value is smaller than an adequacy threshold value then repeating the adequacy routine;
if the adequacy value is equal or greater than an adequacy threshold value then, performing a reliability test, wherein said reliability test comprises the steps of, measuring a second segment of the pulsatility waveform signal for a second time period, wherein the second time period occurs at a time which is after first time period, and determining a first reliability value of the measured second segment of pulsatility waveform from time or amplitude-related features of the second segment of pulsatility waveform;
if the first reliability value is smaller than a reliability threshold value then repeating the initialization routine;
if the first reliability value is equal to, or greater than, the reliability threshold value, then performing said steps of measuring the absolute BP value, and using the measured absolute BP value to calculate a calibration parameter;
wherein the predefined duration of the second time period is adjustable in accordance with the user's heart rate, such that the second time period include at least three heart beats,
wherein the adequacy routine and the reliability test are performed before said calculating a calibration parameter and said calculating a calibrated blood pressure value from the uncalibrated blood pressure value and the calibration parameter.

* * * * *

UNITED STATES PATENT AND TRADEMARK OFFICE
CERTIFICATE OF CORRECTION

| | |
|---|---|
| PATENT NO. | : 12,502,087 B2 |
| APPLICATION NO. | : 17/925258 |
| DATED | : December 23, 2025 |
| INVENTOR(S) | : Sola i Caros et al. |

It is certified that error appears in the above-identified patent and that said Letters Patent is hereby corrected as shown below:

On the Title Page

Item (73), Assignee, Line 1, change "AKTIA SA, Neuchâtel, (CH)" to -- AKTIIA SA, Neuchâtel, (CH) --

Signed and Sealed this
Tenth Day of February, 2026

John A. Squires
*Director of the United States Patent and Trademark Office*